Jan. 5, 1965 J. M. IRVINE, JR 3,164,083

MEANS FOR MOUNTING A REMOVABLE PRINT DRUM

Filed Sept. 25, 1961 3 Sheets-Sheet 1

INVENTOR.
JAMES M. IRVINE, JR.
BY
Walter Patoroka, Jr
ATTORNEY

MEANS FOR MOUNTING A REMOVABLE PRINT DRUM

Filed Sept. 25, 1961 3 Sheets-Sheet 2

INVENTOR.
JAMES M. IRVINE, JR.
BY
Walter Patoorka, Jr
ATTORNEY

Jan. 5, 1965 J. M. IRVINE, JR 3,164,083

MEANS FOR MOUNTING A REMOVABLE PRINT DRUM

Filed Sept. 25, 1961 3 Sheets-Sheet 3

INVENTOR.
JAMES M. IRVINE, JR.
BY
Walter Patraka, Jr.
ATTORNEY

United States Patent Office 3,164,083

Patented Jan. 5, 1965

3,164,083

MEANS FOR MOUNTING A REMOVABLE PRINT DRUM

James M. Irvine, Jr., Detroit, Mich., assignor, by mesne assignments, to Holly Computer Products Company, Warren, Mich., a corporation of Michigan Filed Sept. 25, 1961, Ser. No. 140,455
7 Claims. (Cl. 101—93)

This invention relates to printers for use with electronic computers. More specifically, this invention relates to the print drum and the method of mounting the same disclosed in U.S. application, Serial No. 138,157 entitled High Speed Printer and filed on September 14, 1961 in the names of Arvin D. McGregor and James M. Irvine, Jr.

As stated in the above referenced application, the printer disclosed therein was designed as a general purpose computer accessory that can be used with most types of computers and the printing speed of which is in part dependent upon the type of printing that is desired. For example, the printer may be capable of printing at a certain lower speed where the print drum, and thus the printing involves alpha, numeric and punctuation characters. However, the printing speed could be increased where only alpha or only numeric characters are to be printed. It is possible, for instance, to have a print drum on which several sets of numeric characters are repeated; in that event, the printing speed would be increased in direct relation to the number of additional sets of numeric characters formed on the drum. Additionally, it is often desirable to print special characters such as those contained in a foreign language or those involved in some special line of work.

In view of the above, it is highly desirable to design the printer so that the print drum is interchangeable. In other words, the standard print drum normally used with the printer should be removable so that a different drum with other characters or other character arrangements can be substituted. Furthermore, as opposed to other known printers wherein removal and replacement of the print drum or other character bearing element is a major operation, requiring the services of a skilled technician, this should be easily accomplished by an inexperienced operator without the use of tools. Also, means should be provided to insure that the new drum is properly positioned with respect to the print cam which rotates in a manner to impact selected print hammers into a row of characters formed on the print drum precisely when the row of characters is positioned opposite the row of print hammers.

In the present invention, the above objects are accomplished by providing a hollow cylindrical print drum having rows of identical characters formed on the outer periphery thereof. The print drum is formed with conical surfaces at the ends thereof and mounted between axially aligned drive and free shafts having disks formed with mating conical surfaces adapted to be received in the ends of the drum. The disk mounted on the drive shaft has a projection fitting into a slot formed in the end of the drum so as to properly locate the drum on the drive shaft. The other disk and free shaft on which the drum is mounted are urged toward the drum by a spring, and means are provided to free the spring so that the disk and its shaft may be moved away from the drum and so that the drum can be removed.

The same or a different drum is assembled into the printer merely by placing the notched end of the drum over the projection on the drive disk, lowering the other end of the drum into position to receive the other disk and then loading the spring so that the cone-edged disks will clamp the drum therebetween for purposes of driving the drum.

Another object of the invention is to provide a print drum for an impact type printer, whether it be of the intermittent or the on-the-fly type, that is very easy and inexpensive to manufacture, and yet produces high quality print and has long life.

Another object of the invention is to provide a print drum that is very light in weight, as compared to other known print drums, so as to reduce the energy required to drive the drum, particularly when the drum is employed with an intermittent type printer in which the drum is not continuously rotating but is stopped during the actual printing cycle.

These and other objects of the invention will become readily apparent upon reference to the following specification and attached drawings, wherein:

FIGURE 3 is an enlarged cross-sectional view taken on the plane of line 3—3 of FIGURE 1 and looking in the direction of the arrows.

Figure 1:
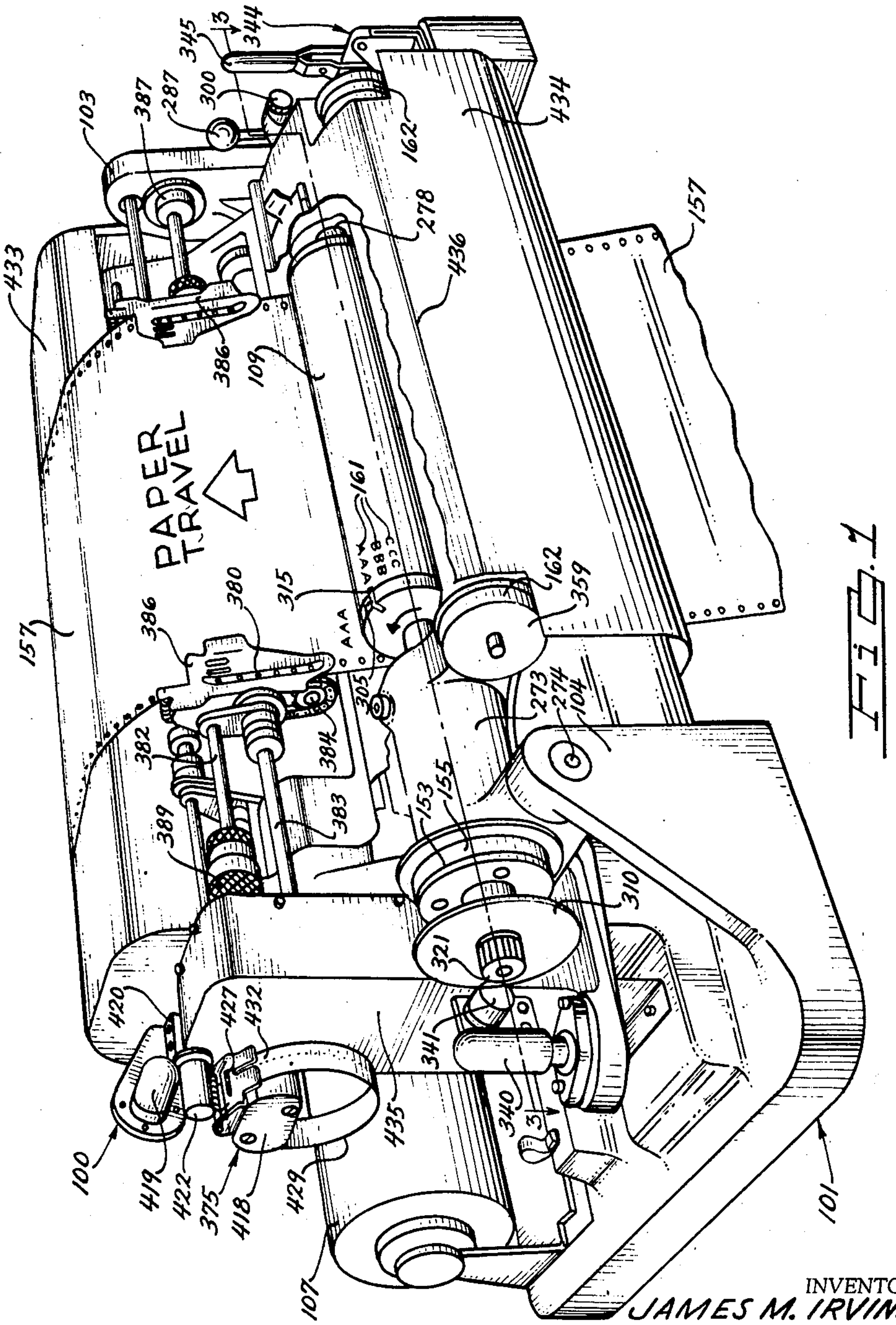
FIGURE 1 is a perspective view of a printer embodying the invention.
Figure 2:
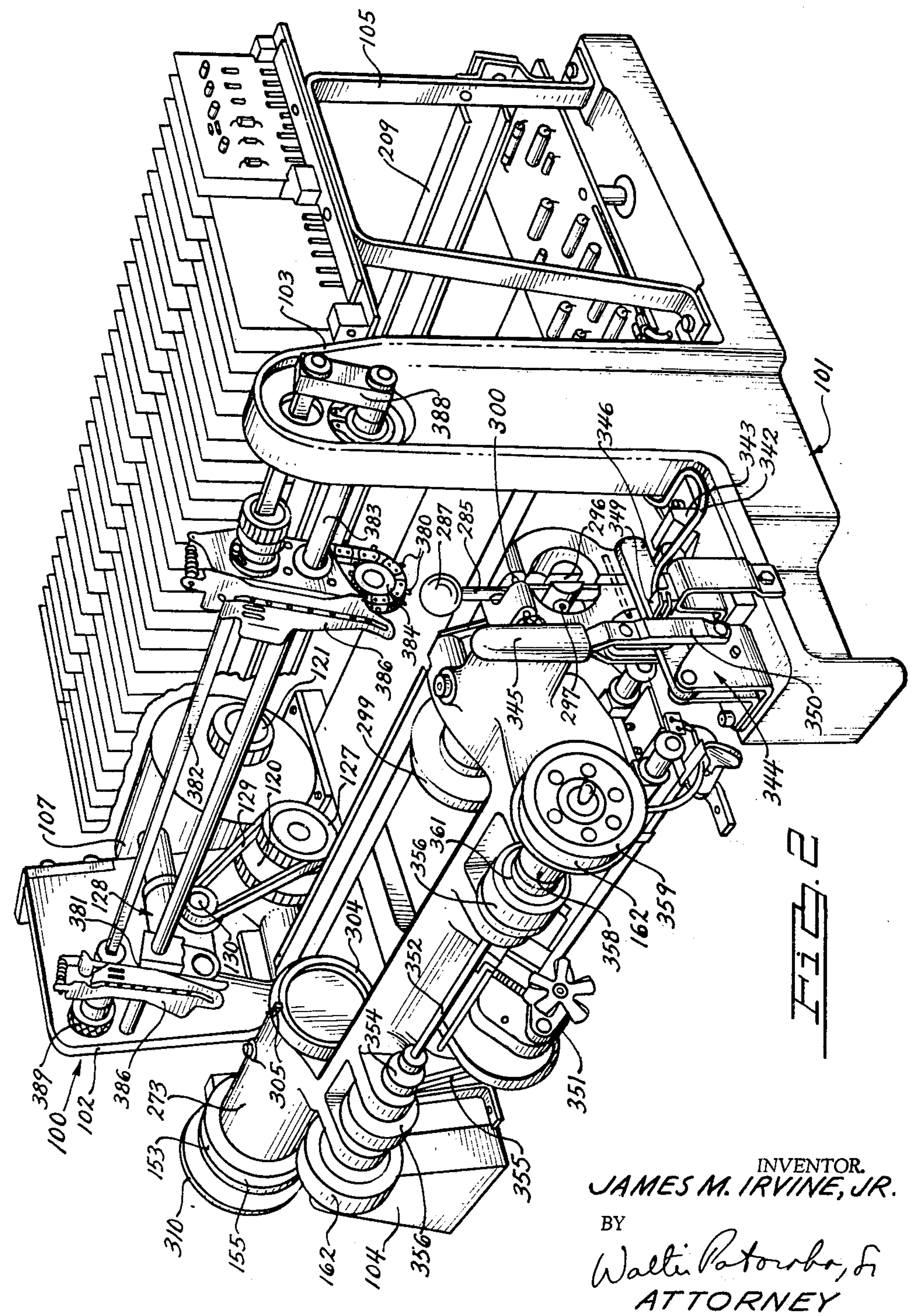
FIGURE 2 is a perspective view from the other end of the printer illustrating the printer with the print drum removed.
Figure 5:
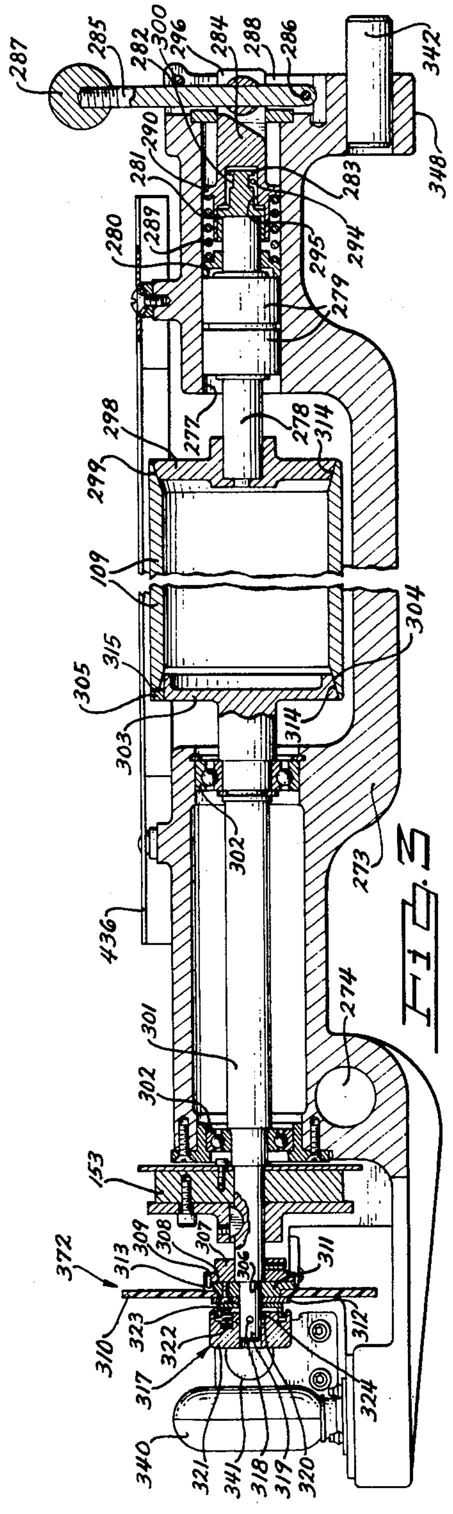

In the above referenced application Serial No. 138,157, the disclosure of which is incorporated by reference to any extent necessary to complete this disclosure, the print drum was described as being mounted in what was referred to as a drum arm group.

Referring now to the drawings, it will be seen that the drum arm group elements are mounted on a suitably formed, relatively elongated casting or other support member 273 that is pivotably secured to the printer main frame 101 on the horizontally disposed pivot pin 274 so that the casting 273 may be raised to the vertical position.

The end of the drum arm casting opposite the pivoted end is formed with a longitudinal cylindrical bore 277 receiving a short shaft 278 mounted in a set of ordinary anti-friction bearings 279, the outer races of which are slidable in the bore 277, an annular spring seat 280 which is also slidable in the bore and an annular cap member 281 which is secured to the end of shaft 278 and formed with a groove 282 so as to terminate in a collar 283. A cylindrical locking member 284, also received in the bore 277 and formed so as to be slidable both within the bore and over cap member 281, has pivotally connected thereto a lever member 285. One end of lever 285 is pivotally fixed to the drum arm casting 273 on pivot 286 so that the lever can be moved outwardly by its upper end 287 from the vertical position shown in the drawings to an angular position through a vertical slot 288 formed in the end of the drum arm casting 273. A helical compression spring 289 is positioned between the spring seat 280 and the annular shoulder 290 formed on the locking member 284. A pin 294 is fixed in the axial bore 295 of the locking member 284 in a manner so as to engage the collar 283 when the lever 285 is moved outwardly. The lever 285 is pivotally fixed intermediate the ends thereof in the slot 296 formed in the end of the locking member 284 on a pivot 297.

From the above construction, it is apparent that the shaft 278 and the disk 298 fixed to shaft 278 and having a conical outer surface 299 are movable longitudinally with respect to casting 273 by movement of the lever 285. In FIGURE 3, shaft 278 and disk 298 are in their innermost position, since the locking member 284 has been moved inwardly by lever 285 to compress the spring 289, which in turn moves the shaft 278 to the left. Moving the lever 285 to the right in FIGURE 3, relieves the spring 289 and eventually causes the shaft 278 to be pulled out to the right due to the engagement of the pin 294 with the collar 283. The lever may be retained in its FIGURE 3 position by any means such as the slidable pin 300.

The pivoted end of the drum arm casting 273 is formed hollow to receive a second longitudinally fixed shaft 301 mounted in a set of suitable bearings 302. The inner end of the shaft 301 has suitably formed thereon or secured thereto another disk 303 substantially identical to disk 298 and also having a conical outer edge 304, except for a locating lug 305 extending therefrom. The portion of the shaft 301 extending beyond the casting 273 has keyed and secured thereto in any suitable manner the drum drive pulley 153.

The extreme outer end of shaft 301 is formed with a further reduced portion so as to provide a shoulder 306. An annular abutment member 307 having an outer face 308 aligned with the shoulder 306 is secured to the shaft 301 by any suitable means such as a set screw, the abutment member having a locating pin 309 extending beyond its outer face. The shaft 301 is also fitted with the code disk 310 of a so-called code disk assembly 372, the code disk comprising a disk of transparent material on which concentric rings of alternating opaque areas constituting a code are formed, the code disk having a central annular opening at which the annular mounting members 311 and 312 are secured by any means such as screws. The mounting members 311 and 312 are also formed with aligned central openings to enable the code disk to be mounted on the reduced end portion of the shaft 301, the mounting member 311 being placed in abutment with the shoulder 306 and the outer surface 308 of the abutment member 307 so that the locating pin 309 is received in a locating slot 313 formed in the mounting member 311.

The print drum 109 is a hollow cylinder made of any suitable material and having the rows of characters 161 suitably formed on the outer surface thereof. The inner ends of the drum are formed with conical surfaces 314 that match the conical surfaces 299 and 304 on the disks 298 and 303, respectively. The drum is placed in the printer by retracting the disk 298 in the manner explained above, applying the end of the drum having the groove or notch 315 formed therein over the disk 303 so that the locating lug 305 is received in the notch 315, lowering the other end of the drum and then forcing the lever 285 to the left in FIGURE 3 so that the disk 298 enters and engages the drum under the force of the compressed spring 289. Removal of the drum is accomplished by the opposite procedure. From the above, it is apparent that drums having only alpha, only numeric, alpha and numeric and different style characters may be quickly interchanged in the printer, provided, of course, that a suitable matching code disk 310 is employed with any particular drum.

The positioning lug 305 is, of course, employed so as to accurately position the drum 109 with respect to the shaft 301. Likewise, the locating pin 309 accurately positions the code disk 310 with respect to the shaft 301. The positions of the lug 305 and the locating pin 309 are such that the code disk 310 having the rings 316 of alternating opaque areas, when used in conjunction with a photodiode assembly to be explained, is able to identify a particular row of characters 161 on the print drum that is approaching the row of printing hammers.

While other printers may employ a cylindrical type print drum having characters formed thereon, most of these print drums are solid cylinders of steel on which the characters are formed. In contrast to this, the print drum disclosed herein is made hollow so as to provide a very light drum that is easily handled and requires less power to drive. Although a heavy print drum may be acceptable in an on-the-fly type of printer in which the drum rotates continuously, it would be very undesirable for use in the type of printer in which the drum is driven intermittently so as to be stationary during the time that the print hammers impact the characters formed on the drum.

The above features are considered to be very significant when it is considered that the print drum disclosed can be manufactured at only a small fraction of the cost of solid steel engraved drums.

It should now be apparent that a printer embodying the invention is rendered extremely versatile because printing can be accomplished in as many different types and styles of characters as there are different sets of related code disks and print drums. Discounting any related changes that may have to be made in some cases in the computer programming and possibly in the printer electronics control circuits, a new style or type of printing can be accomplished merely by changing the print drum and substituting a proper code disk. This can be done even by an unskilled operator. Where the print drum is formed with duplicate sets of characters, the printing speed may be greatly increased.

While only one embodiment of the invention has been shown, it is apparent that other modifications may be made, and no limitations are intended, except as recited in the appended claims.

What I claim as my invention is:

1. In an electro-mechanical printer having a row of print hammers and means for impacting said hammers, a continuously rotated member having characters to be printed formed thereon, said member comprising a hollow cylinder, said cylinder being mounted in said printer on aligned shafts, each of said shafts having a disk formed thereon that is receivable in one end of said cylinder, one of said shafts being a drive shaft, the disk formed on said drive shaft having means to position said cylinder with respect to said shaft, the other of said shafts being spring-biased toward said cylinder so that the disk formed thereon is urged into engagement with said cylinder, and means for retracting said other shaft so as to permit removal of said cylinder from said printer.

2. In an electro-mechanical printer having a row of print hammers and means for impacting said hammers, a continuously rotated member having characters to be printed formed thereon, said member comprising a hollow cylinder, said cylinder being mounted in said printer on axially aligned shafts, each of said shafts having a disk positioned thereon so as to be receivable in one end of said cylinder, one of said shafts being a drive shaft, the disk positioned on said drive shaft having means to properly locate said cylinder angularly with respect to said shaft, the other of said shafts being spring-biased toward said cylinder so that the disk positioned thereon is urged into engagement with said cylinder, and means for retracting said other shaft so as to permit removal of said cylinder from said printer.

3. In an electro-mechanical printer having a row of print hammers and means for impacting said hammers into characters formed on a rotating print drum, a main frame, a print drum support member mounted on said main frame, said support being formed with spaced first and second bearing portions, a drive shaft mounted for rotation and fixed against axial movement in said first bearing portion, a free shaft mounted for rotation and limited axial movement in said second bearing portion, an annular mounting disk formed on the adjacent ends of said shafts, said disks being formed with conical outer edges, a cylindrical print drum having characters formed on the outer surface thereof and being formed with conical inner ends receiving the conical edges of said disks, said disk formed on said drive shaft having a projection thereon in engagement with a notch formed on the end of said drum receiving said disk, said free shaft having a spring associated therewith for forcing said disk formed thereon into said drum, and means for unloading said spring so that said free shaft and its disk may be retracted to permit removal of said drum from said printer.

4. In an electro-mechanical printer having a row of print hammers and means for impacting said hammers into characters formed on a rotating print drum, a main frame, a print drum support member mounted on said main frame, said support being formed with spaced first and second bearing portions, a drive shaft mounted for rotation and fixed against axial movement in said first bearing portion, a free shaft mounted for rotation and limited axial movement in said second bearing portion, a print drum mounting member positioned on each of the adjacent ends of said shafts, a hollow cylindrical print drum having characters formed on the outer surface thereof and having means formed on the inner peripheral ends thereon to receive said mounting member, said mounting member positioned on said drive shaft having means cooperating with means formed on the end of said drum receiving said mounting member for positioning said drum angularly with respect to said drive shaft, said free shaft having a spring means associated therewith for forcing said mounting member positioned thereon into said drum, and means for releasing said latter means so that said free shaft and its mounting member may be retracted to permit removal of said drum from said printer.

5. In an electro-mechanical printer having a row of print hammers and means for impacting said hammers, a continuously rotated member having characters to be printed formed thereon, said member comprising a hollow cylinder having a notch at one end thereof, said cylinder being mounted in said printer on aligned shafts, each of said shafts having a disk formed thereon that is receivable in one end of said cylinder, one of said shafts being a drive shaft, the disk formed on said drive shaft having a locating lug thereon for cooperating with said notch on said one end of said cylinder for positioning said cylinder with respect to said drive shaft, the second of said shafts being slidably inserted at its one end into the other end of said cylinder and having a cap member rigidly attached to its other end, a spring biasing said disk on said second shaft against said hollow cylinder, said spring being confined between a spring seat surrounding said shaft and a locking member slidably located around said cap and means for retracting said second shaft so as to permit removal of said cylinder from said printer, said retracting means comprising a lever pivotally fastened at its one end to said printer by a fixed pivot pin and pivotally connected by a movable pivot pin to said locking member at a point located between the ends thereof, said locking member having a pin therethrough for abutting against a shoulder on said cap member when said lever is rotated about said fixed pivot pin.

6. In an electro-mechanical printer having a continuously rotated drive shaft, a first disk formed on the end of said drive shaft, said first disk having a locating lug at the conical periphery thereof, a hollow cylindrical print drum having characters formed on the outer surface thereof and having conical inner surfaces adjacent the ends thereof, one of said ends having a notch therethrough for cooperation with said locating lugs when one of said conical inner surfaces of said print drum is manually placed on said first disk, a cylinder bore in said printer opposite said drive shaft, a second shaft slidably located in said cylinder bore, said second shaft having a second disk fixedly attached to one end thereof, said second disk having a conical outer periphery suitable for insertion into the second end of said print drum, a cap member fixedly attached to the other end of said second shaft, said cap member having an annular groove and collar at the end thereof, a locking member slidably mounted on said cap member, said locking member having an outer shoulder slidably located in said cylinder bore, a seat member surrounding said second shaft and being slidably mounted in said cylinder bore, a resilient means retained between said outer shoulder and said seat member for biasing said second disk against said other end of said print drum, an off-center pin extending through and fixedly attached to said locking member, said off-center pin being positioned in said groove of said cap member for at times abutting against said collar, a lever pivotally fastened to said printer by a fixed pivot pin, and a second pivot pin connecting said lever to said locking member, said second pivot pin being located intermediate the ends of said lever.

7. In an electro-mechanical printer a pair of aligned cylinder bores, a cored-out recess between said cylinder bores, a drive shaft rotatably mounted in the first of said cylinder bores, a second shaft rotatably and slidably mounted in the second of said cylinder bores, a pair of disks fixedly attached to the opposing ends of said shafts, a hollow print drum having inner conical surfaces adjacent the two ends thereof and adapted to having one end manually placed over said disk on said drive shaft and for having said disk on said second shaft inserted into the other end thereof, and means for at times inserting said second disk into said other end of said hollow print drum and for at other times retracting said second disk from said other end of said print drum, said means comprising a spring surrounding said second shaft for biasing said second disk against said print drum, a collar on the end of said second shaft, a locking member surrounding said collar in said second cylinder bore and having a transversely disposed pin fixedly extending therethrough adapted to at times abut against the inside edge of said collar when said locking member is withdrawn from said second cylinder bore.

References Cited in the file of this patent

UNITED STATES PATENTS

| | | |
|---|---|---|
| 1,008,507 | Wheat | Nov. 14, 1911 |
| 1,891,405 | Ericksson | Dec. 20, 1932 |
| 2,890,517 | Mengel | June 16, 1959 |